US006409907B1

(12) United States Patent
Braun et al.

(10) Patent No.: US 6,409,907 B1
(45) Date of Patent: Jun. 25, 2002

(54) ELECTROCHEMICAL PROCESS FOR FABRICATING ARTICLE EXHIBITING SUBSTANTIAL THREE-DIMENSIONAL ORDER AND RESULTANT ARTICLE

(75) Inventors: Paul VanNest Braun, Berkeley Heights; Michael Louis Steigerwald, Martinsville; Pierre Wiltzius, Millington, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/248,858

(22) Filed: Feb. 11, 1999

(51) Int. Cl.⁷ .............................................. C25D 11/00
(52) U.S. Cl. ....................................... 205/317; 216/56
(58) Field of Search .................................. 205/79, 317

(56) References Cited

U.S. PATENT DOCUMENTS

| | | | | |
|---|---|---|---|---|
| 3,628,017 A | * | 12/1971 | Lerner ........................ | 205/83 |
| 4,425,194 A | * | 1/1984 | Kroger et al. ................ | 204/2.1 |
| 4,488,943 A | * | 12/1984 | Skotheim .................... | 204/58.5 |
| 5,172,267 A | | 12/1992 | Yablonovitch | |
| 5,281,370 A | | 1/1994 | Asher et al. ................. | 264/1.1 |
| 5,365,541 A | | 11/1994 | Bullock | |
| 5,600,483 A | * | 2/1997 | Fan et al. .................... | 359/344 |
| 5,684,817 A | | 11/1997 | Houdre et al. | |
| 5,711,884 A | * | 1/1998 | Asher et al. ................. | 210/650 |
| 5,730,852 A | * | 3/1998 | Bhattacharya et al. ...... | 205/192 |
| 5,737,102 A | * | 4/1998 | Asher ......................... | 359/107 |
| 5,739,796 A | | 4/1998 | Jasper, Jr. et al. | |
| 5,748,057 A | | 5/1998 | De Los Santos | |
| 5,751,466 A | | 5/1998 | Dowling et al. | |
| 5,802,236 A | | 9/1998 | DiGiovanni et al. | |
| 5,804,054 A | * | 9/1998 | Bhattacharya et al. ...... | 205/239 |
| 5,855,753 A | * | 1/1999 | Trau et al. ................... | 204/484 |
| 5,871,630 A | * | 2/1999 | Bhattacharya et al. ...... | 205/192 |
| 5,987,208 A | * | 11/1999 | Guning et al. .............. | 385/146 |

FOREIGN PATENT DOCUMENTS

| | | |
|---|---|---|
| EP | 0972563 A1 | 1/2000 |
| WO | WO 99/47252 | 3/1999 |
| WO | WO 99/47252 | 9/1999 |
| WO | WO 99/47253 | 9/1999 |

OTHER PUBLICATIONS

Russell, P.S.J., "Photonic Band Gaps," *Physics World*, 37 (Aug. 1992).

Amato, I. "Designing Crystals That Say No to Photons," *Science*, vol. 255, 1512 (Jul. 1993).

(List continued on next page.)

*Primary Examiner*—Donald R. Valentine
*Assistant Examiner*—Erica Smith-Hicks
(74) *Attorney, Agent, or Firm*—Scott J. Rittman; John F. McCabe

(57) ABSTRACT

A structure, e.g., a photonic band gap material, exhibiting substantial periodicity on a micron scale is provided. Fabrication involves the steps of providing a template comprising a colloidal crystal, placing the template in an electrolytic solution, electrochemically forming a lattice material, e.g., a high refractive index material, on the colloidal crystal, and then removing the colloidal crystal particles to form the desired structure. The electrodeposition provides a dense, uniform lattice, because formation of the lattice material begins near a conductive substrate, for example, and growth occurs substantially along a plane moving in a single direction, e.g., normal to the conductive substrate. Moreover, because the electrochemically grown lattice is a three-dimensionally interconnected solid, there is very little shrinkage upon subsequent treatment.

13 Claims, 2 Drawing Sheets

OTHER PUBLICATIONS

Wijnhoven, J.E.G. et al., "Preparation of Photonic Crystals Made of Air Spheres in Titania", *Science,* vol. 281, 802 (Aug. 1998).

Zakhidov, A.A., et al., "Carbon Structures with Three–Dimensional Periodicity at Optical Wavelengths," *Science,* vol. 282, 897 (Oct. 1998).

Van Blaaderen, A. et al., "Template–directed colloidal crystallization," *Nature,* vol. 385, 321 (Jan. 1997).

Klein, J.D. et al., "Electrochemical Fabrication of Cadmium Chalcogenide Microdiode arrays," *Chem. Mater.,* vol. 5, 902 (May 1993).

Edamura, T. et al., "Electrodeposition and properties of copper–doped cadmium sulfide," *Thin Solid Films,* vol. 235, 198 (May 1993).

Sun, H. et al., "Three–dimensional photonic crystal structures achieved with two–photon–absorption photopolymerization of resin", *App. Physics Letters,* vol. 74, No. 6, pp. 786–788 (1999). Published Dec. 1998.

Park, S.H. et al., "Macroporous Membranes with Highly Ordered and Three–Dimensionally Interconnected Spherical Pores",*Advanced Materials,* vol. 10, No. 13, pp. 1045–1048 (1998). No Month Available.

Johnson, S.A. et al., "Ordered Mesoporous Polymers of Tunable Pore Size From Colloidal Silica Templates," *Science,* vol. 283, pp. 963–965 (Feb. 1999).

Zhang, Z. et al., "Bismuth quantum–wire arrays fabricated by a vacuum melting and pressure injection process," *J. Mater. Res.,* vol. 13, No. 7 (Jul. 1998).

Vlasov et al., *Advanced Materials,* :Synthesis of Photonic Crystals for Optical Wavelengths from Semiconductor Quantum Dots, vol. 11, No. 2, pp. 165–169, Jan. 22, 1999.

Bogomolov et al., *American Institute of Physics,* "Effect of a Photonic Band Gap in the Optical Range on Solid–State $SiO_2$ Cluster Lattices–Opals", JETP Lett., vol. 63, No. 7, pp. 520–525, Apr. 10, 1996.

Holland, B.T. et al., Synthesis of Macroporous Minerals With Highly Ordered Three–Dimensional Arrays Of Spherical Voids,: *Science,* vol. 281, 538 (Jul. 1998).

* cited by examiner-

ELECTROCHEMICAL PROCESS FOR FABRICATING ARTICLE EXHIBITING SUBSTANTIAL THREE-DIMENSIONAL ORDER AND RESULTANT ARTICLE

BACKGROUND OF THE INVENTION

1. Field of the Invention

The invention relates to structures exhibiting three-dimensional periodicity, for example structures useful for photonic applications.

2. Discussion of the Related Art

Recently, there has been increasing interest in periodic dielectric structures, also referred to as photonic crystals (PC), in particular, photonic crystals exhibiting gaps in photonic band structures (referred to as photonic band gap (PBG) materials), for numerous photonic applications. See, e.g., P. S. J. Russell, "Photonic Band Gaps," *Physics World*, 37, August 1992; I. Amato, "Designing Crystals That Say No to Photons," *Science*, Vol. 255, 1512 (1993); and U.S. Pat. Nos. 5,600,483 and 5,172,267, the disclosures of which are hereby incorporated by reference. PBG materials exhibit a photonic band gap, analogous to a semiconductor's electronic band gap, that suppress propagation of certain frequencies of light, thereby offering, for example, photon localization or inhibition of spontaneous emissions. A PC is generally formed by providing a high refractive index dielectric material with a three-dimensional lattice of cavities or voids having low refractive index. Photons entering the material concentrate either at the high-index regions or the low-index regions, depending on the particular energy of the photon, and the photonic band gap exists for photons of a particular energy between the two regions. Photons having energy within the PBG cannot propagate through the material, and their wave function thereby decays upon entering the material. The photonic band structure, therefore, depends on the precision of the physical structure and on its refractive index, and some difficulty has arisen in fabricating such materials. Specifically, it has been difficult to organize a three-dimensional lattice of micron scale, particularly with high refractive index materials.

In one approach, reflected in the above-cited U.S. Patents, solid materials are provided with numerous holes by mechanical techniques, e.g., drilling, or lithographic techniques, e.g., etching. This approach has provided useful results, but is limited by the ability of current processing technology to provide the necessary structure.

In another approach, ordered colloidal suspensions or sediments of relative low refractive index particles such as polystyrene, referred to as colloidal crystals, are used as templates for infiltration or deposition of high refractive index materials in a desired structure, and the particles are then etched away or burned out to provide the voids. See, e.g., B. T. Holland et al., "Synthesis of Macroporous Minerals with Highly Ordered Three-Dimensional Arrays of Spheroidal Voids," *Science*, Vol. 281, 538 (July 1998); E. G. Judith et al., "Preparation of Photonic Crystals Made of Air Spheres in Titania," *Science*, Vol. 281, 802 (July 1998); and A. A. Zakhidov et al., "Carbon Structures with Three-Dimensional Periodicity at Optical Wavelengths," *Science*, Vol. 282, 897 (October 1998). The infiltration/deposition has been performed, for example, by an alkoxide sol-gel technique and by chemical vapor deposition. The results attained thus far have been interesting, but are far from providing a commercially feasible product. Specifically, the infiltration/deposition of the high refractive index material tends to be insufficient (e.g., low density leading to low refractive index) and non-uniform. For example, during alkoxide sol-gel deposition and CVD, some voids near the outside of the crystal become clogged, such that gelation/deposition at interior voids is inhibited. Moreover, insufficient and inadequate infiltration create voids within the high index material, causing substantial shrinkage, and thus cracking, during removal of the template material.

Thus, improved processes for fabrication of high density, substantially uniform photonic bandgap materials are desired.

SUMMARY OF THE INVENTION

The process of the invention provides a structure, e.g., a photonic band gap material, exhibiting substantial periodicity on a micron scale, the process providing improved density and mechanical integrity compared to current processes. (Periodicity, as used herein indicates that the structure is composed of a three-dimensional periodic array of repeated units. See, e.g., N. W. Ashcroft et al., *Solid State Physics*, 64, W. B. Saunders Co. (1976).) The process involves the steps of providing a template comprising a colloidal crystal, placing the template in an electrolytic solution, and electrochemically forming a lattice material, e.g., a high refractive index material, within the colloidal crystal. The colloidal crystal particles are then typically removed, e.g., by heating, etching, or dissolving, to form the desired structure. The electrode is generally oriented such that the electrodeposition substantially occurs along a plane moving in a single direction, in order to attain a desired density. Moreover, because the electrochemically grown lattice is itself a three-dimensionally interconnected solid, there is substantially no shrinkage upon subsequent treatment to remove the colloidal crystal. Useful lattice materials formed by electrochemistry include but are not limited to cadmium sulfide, cadmium selenide, zinc selenide, selenium, and a variety of metals.

DETAILED DESCRIPTION OF THE INVENTION

Figure 1:
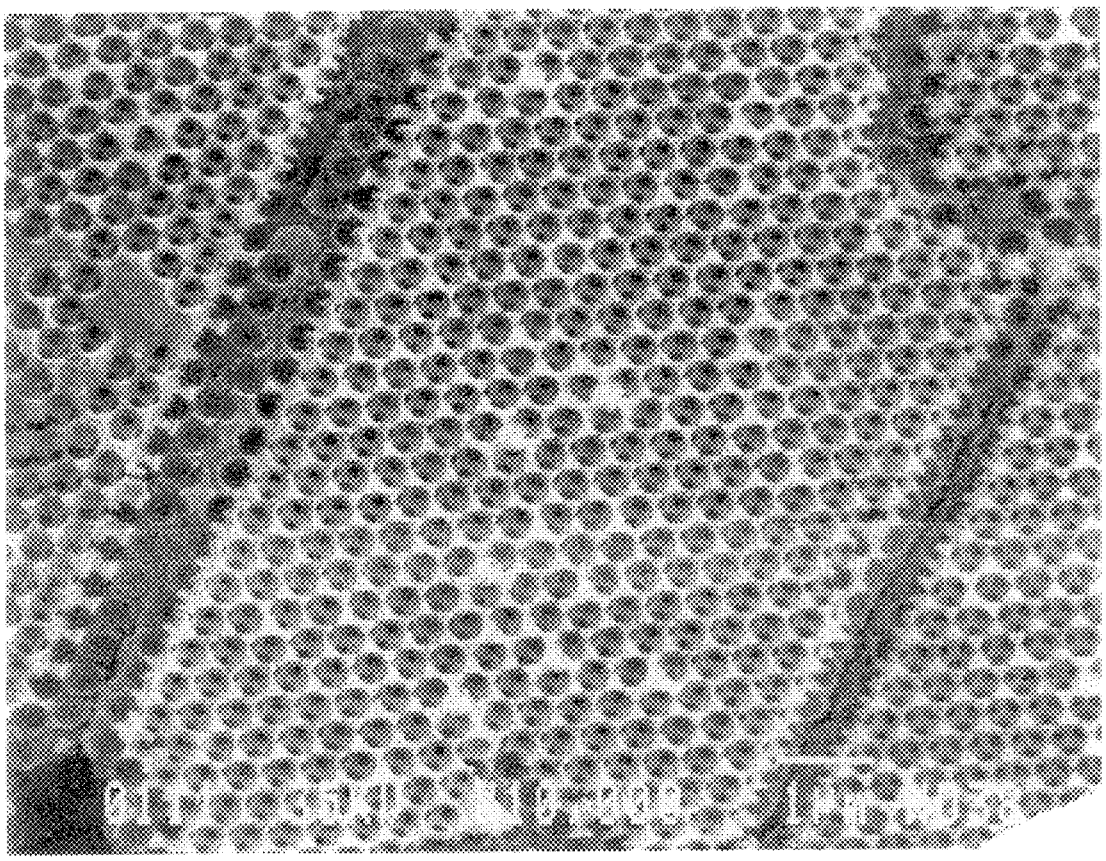
FIG. 1 is a scanning electron micrograph of an ordered cadmium selenide lattice formed according to the invention.

The process of the invention involves the steps of providing a template comprising a colloidal crystal, placing the template in an electrolytic solution, and electrochemically forming a lattice material, e.g., a high refractive index material, within the colloidal crystal. The colloidal crystal particles are then typically removed, e.g., by heating, etching, or dissolving. The resultant structure is a lattice of material containing a periodic array of voids reflecting the crystal template.

Colloidal crystals are periodic structures typically formed from small particles suspended in solution. It is possible to form them by allowing slow sedimentation of substantially uniformly-sized particles in a liquid, such that the particles arrange themselves in a periodic manner. Other fabrication techniques are also possible. For photonic bandgap applications, the average particle diameter typically ranges from about 100 nm to about 5 $\mu$m. A variety of sizes are possible, however, depending on the desired structure and use of the final product and on the availability of nanoparticles sufficiently smaller than the spaces between the crystal's particles. It is possible to form colloidal crystals from any suitable materials. Examples include polystyrene, polymethylmethacrylate, and silica. Polystyrene and other organics are easily removed after formation of the cohesive nanoparticle structure by heating. Silica particles are easily removed by acid etching, e.g., by HF.

The lattice structure of colloidal crystals generally exhibits two-dimensional periodicity, but not necessarily substantial three-dimensional periodicity. Specifically, sedimentation of the colloidal particles induces a random stacking with the close-packed planes perpendicular to gravity. Such a randomly-stacked structure does not exhibit substantial three-dimensional periodicity, because of the randomness in the gravity direction. It is possible that such materials will be suitable for some applications, e.g., filters and catalysts. However, for many PBG applications, it is desired to have materials exhibiting substantial three-dimensional periodicity. One way to do so is to use colloidal epitaxy to form the template crystal, as discussed in A. van Blaaderen et al., "Template-directed colloidal crystallization," *Nature*, Vol. 385, 321 (January 1997), the disclosure of which is hereby incorporated by reference. Colloidal epitaxy involves growing a colloidal crystal normal to an underlying pattern, e.g., a series of holes, reflecting a particular three-dimensionally ordered crystal, e.g., the (100) plane of a face-centered cubic (FCC) crystal. The holes order the first layer of settling colloidal particles in a manner that controls the further sedimentation.

The electrode for the electrodeposition is provided by any suitable technique. For example, it is possible to place the colloidal crystal onto a conductive substrate, to form the crystal on a conductive substrate, or to deposit a conductive layer on one surface of the colloidal crystal. The electrode is generally oriented such that the electrodeposition substantially occurs along a plane moving in a single direction, in order to attain a desired density. The conductive substrate is any material suitable for providing the necessary current during electrodeposition. Examples include indium tin oxide and gold-plated or platinum-plated glass or sapphire (where the plating is performed, for example, by electron beam deposition). Advantageously, the substrate is stable to any etching or dissolving steps used in the process. The conductive substrate and colloidal crystal are typically selected such that the crystal adheres well to the substrate. It is also possible to treat the substrate and crystal to promote such adherence. This adherence is desirable in that it secures the crystal during electrodeposition, which improves the stability, density, and uniformity of the deposited lattice material.

The lattice material is any material suitable for electrodeposition which provides the desired properties in the final structure. For photonic bandgap materials, the lattice material advantageously exhibits a refractive index of about 2 or greater, as well as relatively low loss. Such high index materials include cadmium sulfide, cadmium selenide, selenium, and zinc selenide. A variety of metals are also suitable, e.g., for applications such as filters, catalysts, and biocompatible bodies.

The electrodeposition is performed by any suitable electrochemical routes. Generally, electrochemical techniques used to form thin films on conductive substrates will be suitable for forming the three-dimensional lattice within the template crystal. One particular consideration is that the substrate, the colloidal crystal, and the electrodeposition method should be selected such that the substrate and crystal remain substantially intact during the electrodeposition. In addition, a technique that provides a sufficiently fast growth rate is typically desired. The electrodeposition provides a dense, uniform lattice, because formation begins near the conductive substrate (or other electrode), and moves up the colloidal crystal template, with growth occurring substantially along a plane moving in a single direction, e.g., normal to the substrate. Moreover, because the electrochemically grown lattice is a three-dimensionally interconnected solid, there is very little shrinkage upon subsequent treatment to remove the colloidal crystal.

Once electrodeposition is completed, the resulting composite material is generally treated to remove the colloidal crystal material. For example, in the case of an organic colloidal crystal, the composite is typically heated to burn out the organics, e.g., at a temperature of at least 250° C. Other techniques are also possible, such as irradiation or plasma-assisted etching of the organic material. In the case of inorganic materials, a suitable etchant is generally applied, e.g., exposure of silica to HF. It is possible for such an etchant to also remove the underlying conductive substrate, depending on the particular substrate used. The size of the voids depend on the particles of the colloidal crystal, as mentioned above. For photonic applications, the voids typically range from about 100 nm to about 5 $\mu$m, and the effective refractive index is advantageously greater than 2.

The ordered structure is useful for a variety of photonic applications, including optical filters, optical switches, waveguides, routers, laser cavities and other photonic bandgap applications. Particular design considerations for PBG materials are known in the art, as reflected for example in J. D. Joannopoulos et al., *Photonic Crystals*, Princeton University Press (1995), the disclosure of which is hereby incorporated by reference. Other applications include filters, catalysts, and biocompatible materials.

The invention will be further clarified by the following examples, which are intended to be exemplary.

EXAMPLE 1

A room temperature, aqueous-based potentiostatic deposition of CdSe was performed as follows. (See also J. D. Klein et al., "Electrochemical Fabrication of Cadmium Chalcogenide Microdiode Arrays," *Chem. Mater.*, Vol. 5, 902 (1993).) An indium tin oxide substrate (deposited on glass) was used, the substrate having been cleaned by a 10 minute sonication in ethanol, followed by a 1 minute sonication in 50% HCl. A polystyrene colloidal crystal was formed from a water-based suspension, and was placed onto an indium tin oxide substrate. The crystal and substrate were annealed at 105° C. for one hour, and were then placed into the electrolyte.

The potentiostatic deposition of CdSe involved cycling between a potential just slightly negative of the $Cd^{2+}$ reduction potential (−760 mV vs. saturated calomel electrode (SCE)), to a potential significantly positive of the $Cd^{2+}$ reduction potential. (See J. D. Klein et al., supra.) The actual potentials used were −400 mV and −800 mV vs. SCE, and were applied as a 20 Hz square wave. The electrolyte was 0.3 M $CdSO_4$, 0.25 M $H_2SO_4$, and 1 mM $SeO_2$ in water. Deposition was performed for 1 hour. The polystyrene was removed by multiple washings in toluene and dimethylformamide. The resulting lattice is shown in FIG. 1.

EXAMPLE 2

An elevated temperature, organic solvent-based galvanostatic growth of CdS was performed as follows. (See also T. Edamura and J. Muto, "Electrodeposition and properties of copper-doped cadmium sulfide," *Thin Solid Films,* Vol. 235, 198 (1993).) The substrate was an electron-beam deposited gold layer on glass. A silica colloidal crystal having 0.99 µm particles was formed by sedimentation onto the gold layer.

Figure 2:
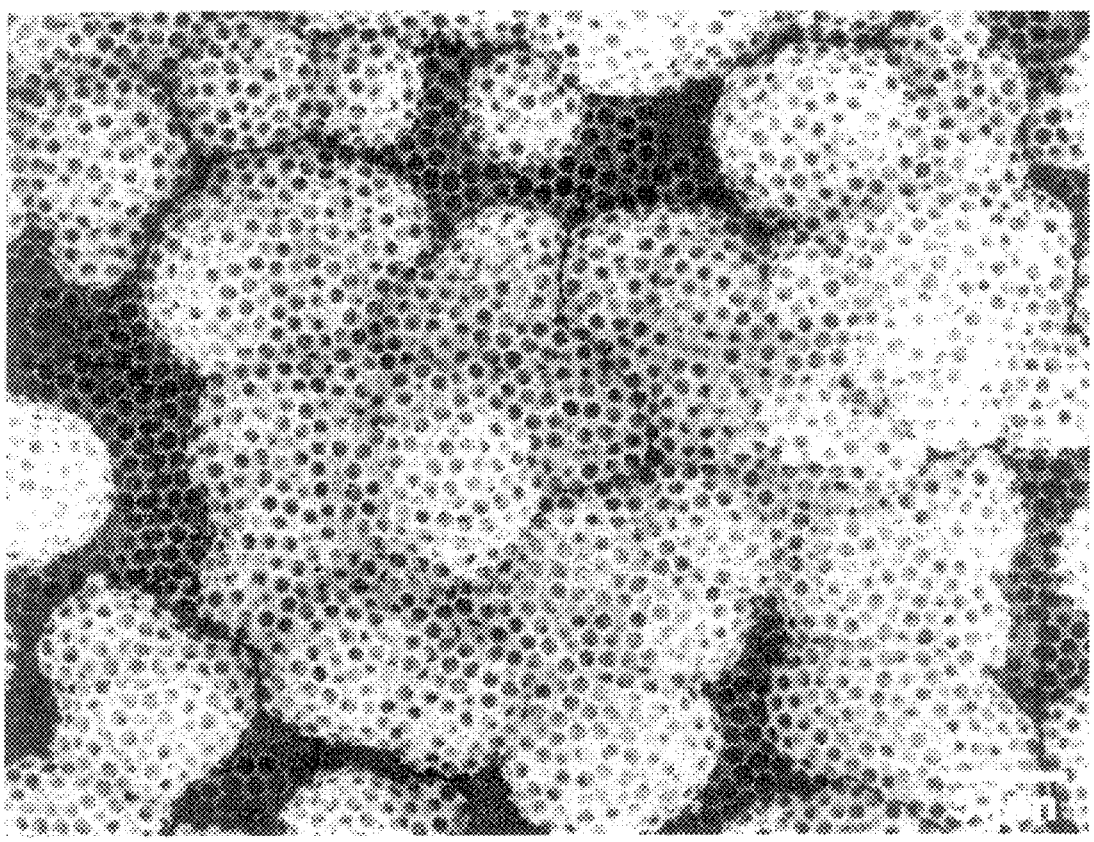
FIG. 2 is a scanning electron micrograph of an ordered cadmium sulfide lattice formed according to the invention.

The galvanic deposition was performed using a current density of 1 mA/cm$^3$, with a voltage limit of 10 V, which limited the actual current for the first couple of minutes of the experiment. The electrolyte system consisted of 0.055 M CdCl$_2$, and 0.19 M sulfur in dimethylformamide, and the electrodeposition was run at 115° C. for 30 minutes. Following the electrodeposition, the SiO$_2$ colloidal crystal was dissolved with about 5% HF in water overnight (which also dissolved the underlying glass substrate). The resulting lattice structure is shown in FIG. 2.

Other embodiments of the invention will be apparent to those skilled in the art from consideration of the specification and practice of the invention disclosed herein.

What is claimed is:

1. A process for fabricating an article comprising a material exhibiting substantial periodicity, the process comprising the steps of:

providing a template comprising a colloidal crystal;

electrochemically depositing a lattice material onto the colloidal crystal; and removing the colloidal crystal to form the material exhibiting substantial periodicity.

2. The process of claim 1, wherein the deposition of the lattice material occurs substantially along a plane moving in a single direction.

3. The process of claim 1, wherein the material exhibits a photonic bandgap.

4. The process of claim 1, wherein the particles of the colloidal crystal have an average diameter ranging from about 100 nm to about 5 µm.

5. The process of claim 1, wherein the particles of the colloidal crystal are selected from polystyrene, polymethylmethacrylate, and silica.

6. The process of claim 1, wherein the lattice material is selected from cadmium sulfide, cadmium selenide, zinc selenide, and selenium.

7. The process of claim 1, wherein the removal of the colloidal crystal is performed by a step selected from heating, and exposure to an acid.

8. The process of claim 1, further comprising the step of forming the colloidal crystal by colloidal epitaxy.

9. The process of claim 8, wherein the colloidal crystal exhibits a face-centered cubic structure.

10. The process of claim 1, wherein the lattice material exhibits a refractive index of at least 2.

11. A process for fabricating an article comprising a photonic bandgap material exhibiting a three-dimensional periodicity, the process comprising the steps of:

providing a template comprising a colloidal crystal with a three-dimensional periodicity; and electrochemically depositing a lattice material into the colloidal crystal to grow a lattice structure with a three-dimensional lattice periodicity within the colloidal crystal.

12. The process of claim 11, wherein the deposition of the lattice material occurs substantially along a plane moving in a single direction.

13. The process of claim 11, wherein the particles of the colloidal crystal have an average diameter ranging from about 100 nm to about 5 µm.

* * * * *